(12) United States Patent
Kato et al.

(10) Patent No.: US 10,955,062 B2
(45) Date of Patent: Mar. 23, 2021

(54) GLASS BALL SAFETY VALVE

(71) Applicant: KAWASAKI JUKOGYO KABUSHIKI KAISHA, Kobe (JP)

(72) Inventors: Kodai Kato, Kakogawa (JP); Yutaka Suzuki, Kobe (JP); Makoto Ninomiya, Kobe (JP); Masayoshi Okamoto, Akashi (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 104 days.

(21) Appl. No.: 16/335,423

(22) PCT Filed: Sep. 12, 2017

(86) PCT No.: PCT/JP2017/032779
§ 371 (c)(1),
(2) Date: Mar. 21, 2019

(87) PCT Pub. No.: WO2018/056110
PCT Pub. Date: Mar. 29, 2018

(65) Prior Publication Data
US 2020/0018411 A1    Jan. 16, 2020

(30) Foreign Application Priority Data

Sep. 21, 2016   (JP) .............................. JP2016-184111

(51) Int. Cl.
*F16K 17/38* (2006.01)
*F16K 17/40* (2006.01)
*F16K 27/02* (2006.01)

(52) U.S. Cl.
CPC ............ *F16K 17/38* (2013.01); *F16K 17/383* (2013.01); *F16K 17/40* (2013.01);
(Continued)

(58) Field of Classification Search
CPC ........ F16K 17/38; F16K 17/383; F16K 17/40; F16K 17/406; F17C 13/04
See application file for complete search history.

(56) References Cited

U.S. PATENT DOCUMENTS 5,533,576 A * 7/1996 Mears ................. A62C 37/20
169/38
6,112,821 A * 9/2000 Yokoi ................. A62C 37/12
169/37

(Continued)

FOREIGN PATENT DOCUMENTS

| CN | 104487747 A | 4/2015 |
|---|---|---|
| WO | 2016/070260 A1 | 5/2016 |

*Primary Examiner* — Kevin L Lee
(74) *Attorney, Agent, or Firm* — Oliff PLC

(57) ABSTRACT

A glass ball safety valve includes: a housing including a valve passage connecting a first and second port; a valve element provided in the housing so as to close the passage, the element being movable in an open direction so as to open the passage; a biasing spring configured to bias the element in the open direction; a glass ball provided in the housing so as to support the element against biasing force of the biasing spring with a space between the element and the housing in the open direction, the glass ball including a longitudinal-direction intermediate portion that breaks at a predetermined temperature, the glass ball in a broken state allowing a movement of the valve element in the open direction; and a holding body provided in the housing and holding at least one of a first longitudinal-direction end-side portion and second longitudinal-direction end-side portion of the glass ball.

8 Claims, 6 Drawing Sheets

(52) U.S. Cl.
  CPC .. *F16K 27/0263* (2013.01); *F17C 2205/0314* (2013.01); *F17C 2205/0332* (2013.01); *F17C 2223/035* (2013.01); *F17C 2250/0439* (2013.01)

(56) References Cited

U.S. PATENT DOCUMENTS

| | | | |
|---|---|---|---|
| 10,195,473 B1* | 2/2019 | Silva, Jr. et al. | A62C 37/14 |
| 2010/0193050 A1 | 8/2010 | Job | |
| 2014/0261742 A1* | 9/2014 | Heise | F16K 31/002 137/15.18 |
| 2015/0159764 A1 | 6/2015 | Peli et al. | |
| 2018/0272171 A1* | 9/2018 | Groen et al. | A62C 37/14 |

* cited by examiner

GLASS BALL SAFETY VALVE

TECHNICAL FIELD

The present invention relates to a glass ball safety valve including a glass ball.

BACKGROUND ART

For example, a safety valve is provided at a high-pressure tank in order to discharge a gas to the atmosphere in case of fire. Known as one example of the safety valve is a thermosensitive safety valve disclosed in PTL 1. The safety valve of PTL 1 is a thermosensitive safety valve including a glass ball and also includes a valve element. The valve element is supported by the glass ball and closes a passage in this state. The glass ball breaks at a predetermined temperature. When the glass ball breaks, the valve element moves. Thus, the passage opens, and the gas in the high-pressure tank is discharged to the atmosphere.

CITATION LIST

Patent Literature

PTL 1: U.S. Patent Application Publication No. 2010/0193050

SUMMARY OF INVENTION

Technical Problem

The glass ball includes a hollow, long, substantially columnar casing, and a liquid is sealed in the casing. The casing breaks when the liquid expands by temperature increase. An intermediate portion of the casing mainly breaks. Therefore, there is a possibility that a first longitudinal-direction end-side portion and second longitudinal-direction end-side portion of the glass ball are left as large fragments. If the large fragment is sandwiched between the valve element and the housing, the valve element cannot move to a desired position. With this, the gas cannot be quickly discharged, and a desired function cannot be achieved.

An object of the present invention is to provide a glass ball safety valve capable of preventing a large fragment of a broken glass ball from hindering a movement of a valve element.

Solution to Problem

A glass ball safety valve of the present invention includes: a housing including a valve passage connecting a first port and a second port; a valve element provided in the housing so as to close the valve passage, the valve element being movable in an open direction so as to open the valve passage; a biasing spring configured to bias the valve element in the open direction; a glass ball extending in the open direction from the valve element and provided in the housing so as to support the valve element against biasing force of the biasing spring with a space between the valve element and the housing, the glass ball including a longitudinal-direction intermediate portion that breaks at a predetermined temperature, the glass ball in a broken state allowing a movement of the valve element in the open direction; and a holding body provided in the housing and holding at least one of a first longitudinal-direction end-side portion and second longitudinal-direction end-side portion of the glass ball.

According to the present invention, the holding body holds at least one of the first longitudinal-direction end-side portion and second longitudinal-direction end-side portion of the glass ball. Therefore, the first longitudinal-direction end-side portion or the second longitudinal-direction end-side portion which is held by the holding body can be prevented from getting into the space between the valve element and the housing. Thus, the first longitudinal-direction end-side portion or the second longitudinal-direction end-side portion which is held by the holding body can be prevented from hindering the movement of the valve element in the open direction.

In the above invention, the holding body may include: a first holding member provided at the valve element and holding the first longitudinal-direction end-side portion of the glass ball; and a second holding member provided at the housing and holding the second longitudinal-direction end-side portion of the glass ball.

According to the above configuration, both of the longitudinal-direction end-side portions of the glass ball are held by the respective first and second holding members. Therefore, when the glass ball breaks, the longitudinal-direction end-side portions can be prevented from getting into the space. On this account, the possibility that the movement of the valve element in the open direction is hindered can be further reduced as compared to a case where only one of the longitudinal-direction end-side portions is held.

In the above invention, each of the first holding member and the second holding member may be formed in an annular shape and elastically deformable.

According to the above configuration, the two holding members can sandwich the respective longitudinal-direction end-side portions of the glass ball over the entire periphery. Therefore, the longitudinal-direction end-side portions of the glass ball can be tightly held, and the first longitudinal-direction end-side portion and the second longitudinal-direction end-side portion can be prevented from getting into the space.

In the above invention, the glass ball safety valve may be configured such that: the first longitudinal-direction end-side portion and second longitudinal-direction end-side portion of the glass ball include respective partially spherical parts each of which is larger in diameter than the intermediate portion of the glass ball; and the first holding member and the second holding member hold the respective partially spherical parts.

According to the above configuration, the partially spherical parts each of which is larger in diameter than the intermediate portion are held. Therefore, the two holding members can elastically deform more largely than a case where the intermediate portion is held. With this, the glass ball can be held by large holding force of the two holding members.

In the above invention, the glass ball safety valve may be configured such that: the first longitudinal-direction end-side portion of the glass ball supports the valve element through a first spacer made of synthetic resin; the housing supports the second longitudinal-direction end-side portion of the glass ball through a second spacer made of synthetic resin; and elastic moduli of the first spacer and the second spacer are lower than elastic moduli of the first holding member and the second holding member.

According to the above configuration, the glass ball can be prevented from being damaged by sliding on the valve element or the housing. Further, since the elastic deformation of the spacer is smaller than that of the holding member, the deformation of the spacer supporting the glass ball can be suppressed. With this, the valve element can be prevented from moving in the open direction by the deformation of the spacer.

In the above invention, the glass ball safety valve may be configured such that: the first longitudinal-direction end-side portion of the glass ball supports the valve element through a first spacer made of synthetic resin; the housing supports the second longitudinal-direction end-side portion of the glass ball through a second spacer made of synthetic resin; the first holding member is configured integrally with the first spacer; and the second holding member is configured integrally with the second spacer.

According to the above configuration, the number of parts can be reduced.

In the above invention, the glass ball safety valve may be configured such that: the housing includes a block and a cap, the block including a valve hole at which the valve element is arranged, the cap being configured to close the valve hole; and the second holding member is provided at the cap.

According to the above configuration, at least one of the first longitudinal-direction end-side portion and second longitudinal-direction end-side portion of the glass ball can be held by the holding body. Therefore, when assembling the cap to the block to close the valve hole, the inclination, position, and the like of the holding body can be adjusted in advance. Thus, the glass ball is easily assembled.

In the above invention, the glass ball safety valve may be configured such that: the valve element is provided in the housing so as to move in the open direction along an inner peripheral surface of the housing; a sliding body is provided at the valve element so as to contact the inner peripheral surface of the housing and seal a gap between the valve element and the inner peripheral surface of the housing; and frictional resistance of the sliding body is lower than frictional resistance of the valve element.

According to the above configuration, fragments generated when the glass ball breaks can be prevented from getting into the gap between the valve element and the inner peripheral surface of the housing. This can prevent, for example, an increase in sliding resistance generated when the fragments get into the above gap can be prevented.

Advantageous Effects of Invention

According to the present invention, the movement of the valve element can be prevented from being hindered by the large fragments of the broken glass ball.

The above object, other objects, features, and advantages of the present invention will be made clear by the following detailed explanation of preferred embodiments with reference to the attached drawings.

BRIEF DESCRIPTION OF DRAWINGS

FIG. 3A shows that the glass ball is attached to a cap, and FIG. 3B shows that the glass ball is attached to a valve element.

DESCRIPTION OF EMBODIMENTS

Hereinafter, glass ball safety valves (hereinafter simply referred to as "safety valves") 1 and 1A to 1C according to Embodiments 1 to 4 of the present invention will be explained with reference to the drawings. It should be noted that directions stated in the following explanations are used for convenience sake, and directions and the like of components of the present invention are not limited. Further, each of the safety valves 1 and 1A to 1C is just one embodiment of the present invention. Therefore, the present invention is not limited to the embodiments, and additions, deletions, and modifications may be made within the scope of the present invention.

Embodiment 1

Figure 1:
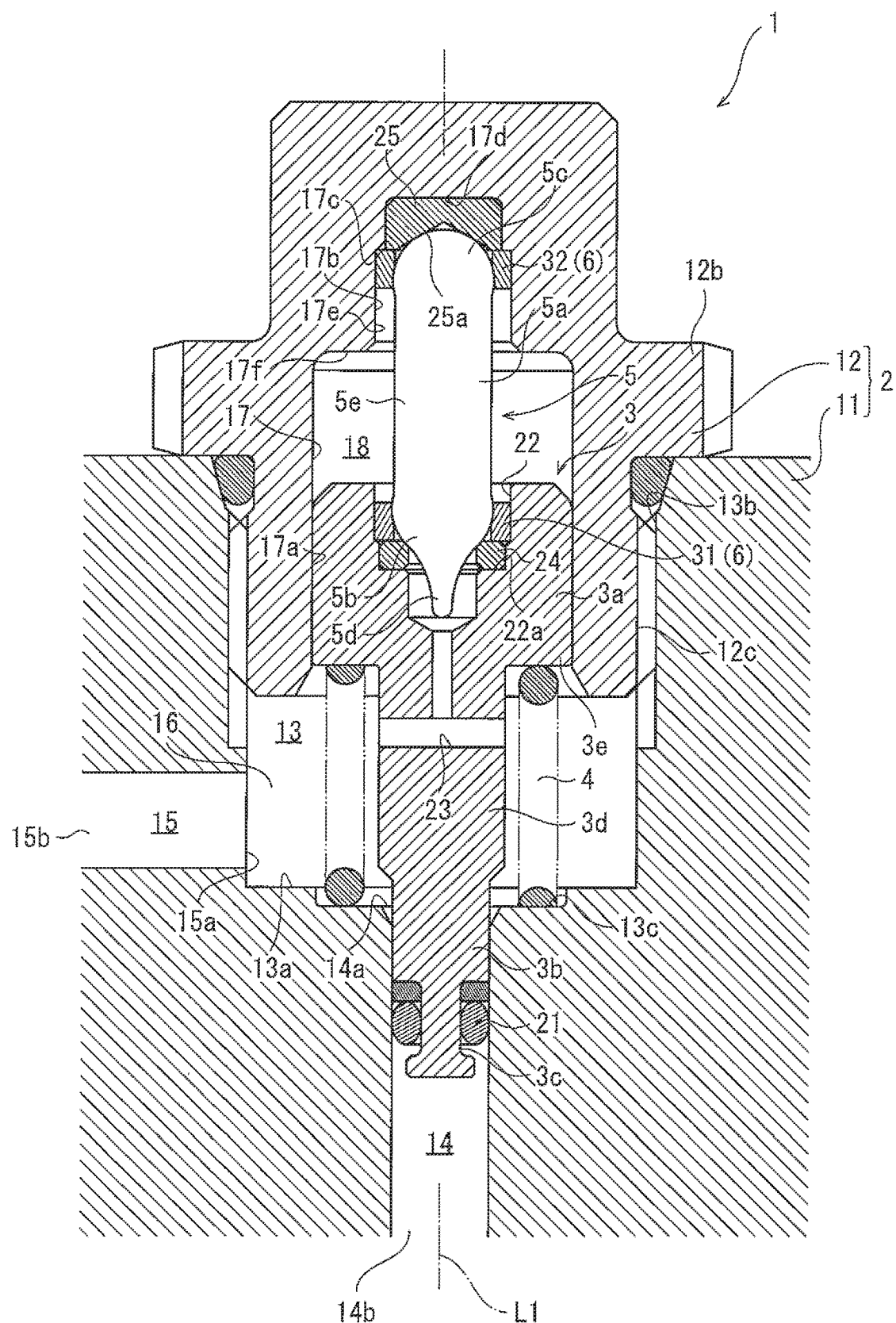
FIG. 1 is a sectional view showing a glass ball safety valve according to Embodiment 1 of the present invention.

For example, when handling a high-pressure gas, the safety valve 1 shown in FIG. 1 is provided at a fluid device, such as a high-pressure tank, in order to discharge the gas to the atmosphere in case of fire. The safety valve 1 is one type of thermosensitive safety valve. When an ambient temperature of the safety valve 1 becomes a predetermined temperature or more, the safety valve 1 connects the fluid device with the atmosphere to discharge the gas in the high-pressure tank to the atmosphere. The safety valve 1 having such function includes a housing 2, a valve element 3, a biasing spring 4, a glass ball 5, and a holding body 6.

Housing

The housing 2 includes a block 11 and a cap 12. The block 11 includes a valve hole 13, a high-pressure passage 14, and an atmosphere open passage 15. The valve hole 13 is a bottomed hole formed along a predetermined axis L1 and having a circular cross section. The high-pressure passage 14 is formed on a bottom surface 13a of the valve hole 13 along the axis L1. The atmosphere open passage 15 is formed on a side surface of the valve hole 13 so as to extend in a radial direction. The high-pressure passage 14 is connected to the valve hole 13 through an opening 14a and also connected to a high-pressure tank (not shown) through a first port 14b. The atmosphere open passage 15 is connected to the valve hole 13 through an opening 15a and also connected to the atmosphere through a second port 15b.

These two passages 14 and 15 formed as above and a part of the valve hole 13 (i.e., a space around a below-described intermediate portion 3d of the valve element 3) constitute a valve passage 16. The first port 14b and the second port 15b are connected to each other by the valve passage 16. The valve hole 13 includes an opening 13b at an opposite side of the bottom surface 13a in an axial direction. The cap 12 is inserted in the opening 13b. The cap 12 is threadedly engaged with an inner peripheral surface of the block 11 in a sealed state.

The cap 12 is a substantially cylindrical member and includes a flange portion 12b at an intermediate portion of an outer peripheral surface thereof. The flange portion 12b is formed in a substantially polygonal shape (in the present embodiment, a hexagonal shape) in a plan view and can be held with an attaching tool, such as a wrench. The cap 12 includes an external screw 12c at a tip end side of the flange portion 12b on the outer peripheral surface thereof. The external screw 12c is threadedly engaged with the inner peripheral surface of the block 11. With this, the cap 12 is fixed to the block 11 with a part of the cap 12 projecting from the block 11, the part being located at a base end side of the flange portion 12b. The cap 12 includes an inner hole 17. The inner hole 17 includes a large-diameter portion 17a and a small-diameter portion 17b. The large-diameter portion 17a is larger in diameter than the small-diameter portion 17b and is located at the tip end side of the small-diameter portion 17b. The valve element 3 is inserted in the large-diameter portion 17a.

Valve Element

The valve element 3 is formed in a substantially columnar shape, and a base end portion 3a thereof is larger in diameter than the other portion thereof. An outer diameter of the base end portion 3a is substantially equal to the diameter of the large-diameter portion 17a of the cap 12. The base end portion 3a is fitted in an inner peripheral surface of the cap 12. A tip end-side portion 3b of the valve element 3 is smaller in diameter than the other portion thereof. More specifically, a diameter of the tip end-side portion 3b is substantially equal to a diameter of the high-pressure passage 14, and the tip end-side portion 3b is inserted in the high-pressure passage 14. A tip end side of an outer peripheral surface of the tip end-side portion 3b of the valve element 3 is concave in a radially inner direction over the entire periphery, and a sealing member 21 is externally attached to a concave portion 3c. The sealing member 21 seals a gap between the tip end-side portion 3b of the valve element 3 and an inner peripheral surface of the high-pressure passage 14. The valve passage 16 is closed by inserting the valve element 3 in the high-pressure passage 14.

Figure 2:
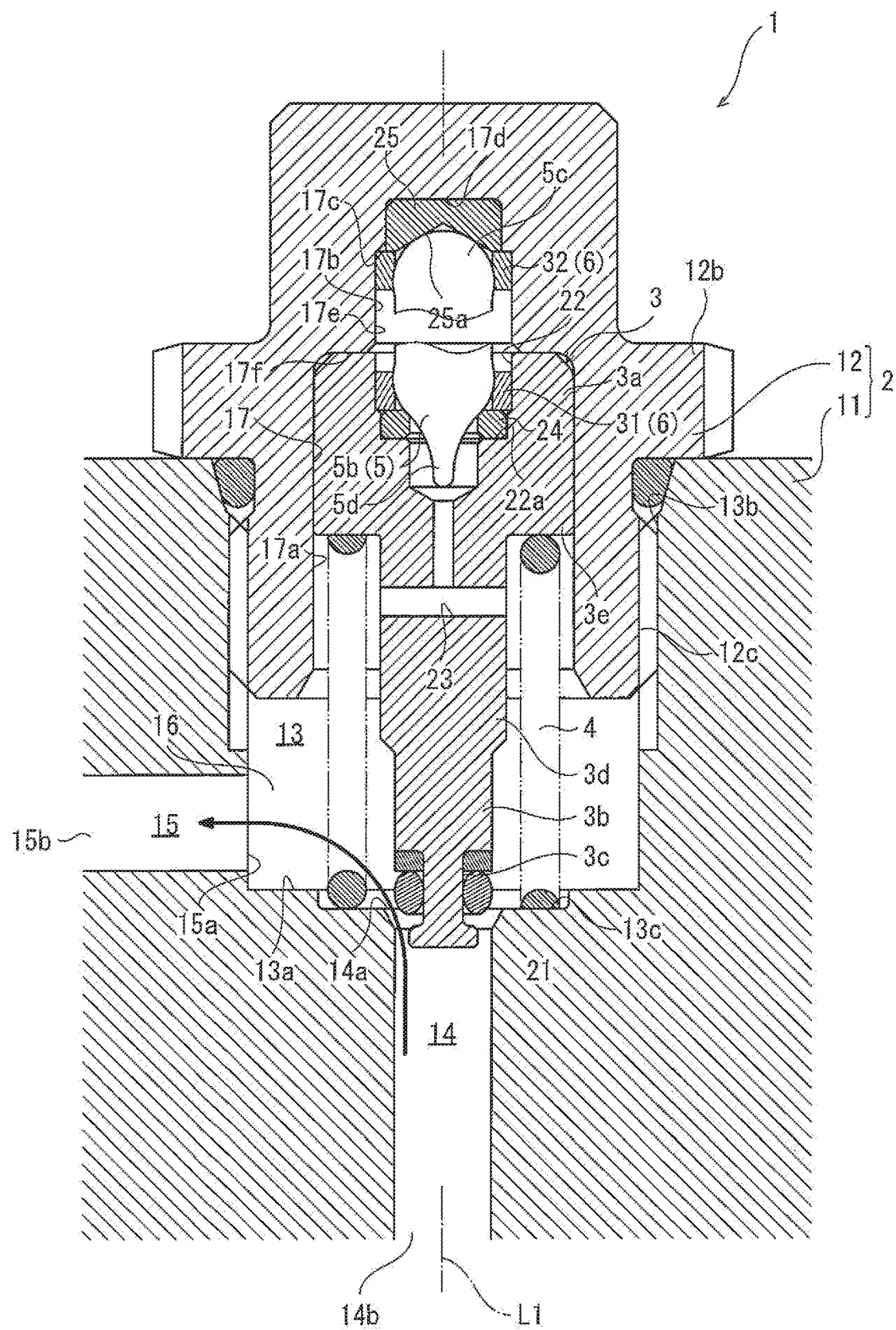
FIG. 2 is a sectional view showing a state where a glass ball is broken in the glass ball safety valve of FIG. 1.

The base end portion of the valve element 3 is fitted in the cap 12 so as to be slidable. The valve element 3 is movable between a closed position set such that the valve element 3 closes the valve passage 16 and an open position set such that the valve element 3 opens the valve passage 16. When the valve element 3 is located at the open position, the tip end-side portion 3b of the valve element 3 comes out from the high-pressure passage 14. To be specific, the open position of the valve element 3 is set such that the high-pressure passage 14 is open as shown in FIG. 2. In an initial state, the valve element 3 is located at the closed position as shown in FIG. 1, and the biasing spring 4 biases the valve element 3 to move the valve element 3 to the open position.

Biasing Spring

The biasing spring 4 is a so-called compression coil spring and is externally attached to the intermediate portion 3d of the valve element 3. The base end portion 3a of the valve element 3 is larger in diameter than the intermediate portion 3d. To be specific, the base end portion 3a projects in a radially outer direction beyond the intermediate portion 3d, and a spring receiver 3e is constituted by this projecting portion. The spring receiver 3e is opposed to the bottom surface 13a of the valve hole 13 at a first side in the axial direction. A concave portion 13c is formed at a position on the bottom surface 13a of the valve hole 13, the position being opposed to the spring receiver 3e. The biasing spring 4 in a compressed state is arranged between the concave portion 13c and the spring receiver 3e which are opposed to each other. The valve element 3 is biased by the biasing spring 4 toward the open position (i.e., toward a second side in the axial direction). To be specific, the valve element 3 is pushed by the fluid of the high-pressure passage 14 and the biasing spring 4 toward the open position (i.e., in an open direction). The glass ball 5 supports the valve element 3 against the biasing of the biasing spring 4 and the pushing of the fluid.

Glass Ball

The glass ball 5 is configured to break when an ambient temperature of the glass ball 5 reaches a predetermined temperature. More specifically, the glass ball 5 includes a casing 5a made of glass. The casing 5a is formed in a substantially columnar shape that is long in the axial direction and hollow. The casing 5a includes a first longitudinal-direction end portion 5b and a second longitudinal-direction end portion 5c, each of which is formed in a substantially partially spherical shape. The first longitudinal-direction end portion 5b includes a tip end portion 5d that projects toward the first side in the axial direction and tapers toward a tip end thereof. The casing 5a of the glass ball 5 does not necessarily have to have such shape. Each of the longitudinal-direction end portions 5b and 5c may be simply formed in a partially spherical shape.

The casing 5a having such shape is filled with a liquid (for example, naphthalene), not shown. The liquid has thermal expandability, i.e., the liquid expands when a temperature thereof increases. When the ambient temperature of the glass ball 5 increases to reach the predetermined temperature, the casing 5a breaks by the expansion of the liquid. An inner space of the casing 5a is mainly formed at an intermediate portion 5e (i.e., a portion between both of the longitudinal-direction end portions) other than the longitudinal-direction end portions 5b and 5c, and the intermediate portion 5e mainly breaks. To be specific, the longitudinal-direction end portions 5b and 5c do not break and are left as large fragments.

The glass ball 5 configured as above is attached to the base end portion 3a of the valve element 3 and the small-diameter portion 17b of the cap 12. An insertion hole 22 is formed at a second axial portion of the base end portion 3a of the valve element 3. The insertion hole 22 is formed along the axis L1, and a base end side thereof is larger in diameter than a tip end side thereof. With this, a step 22a is formed at an intermediate portion of the insertion hole 22, and a first spacer 24 is fitted in a portion of the insertion hole 22 which portion is located at the base end side of the step 22a.

The first spacer 24 is a member made of synthetic resin and having a substantially annular shape. The tip end portion 5d of the casing 5a is inserted in an inner hole of the first spacer 24. The inner hole of the first spacer 24 is smaller in diameter than the first longitudinal-direction end portion 5b except for the tip end portion 5d. Therefore, by inserting the casing 5a in the inner hole of the first spacer 24, the first longitudinal-direction end portion 5b is supported by the first spacer 24. The tip end portion 5d of the casing 5a is smaller in diameter than the tip end side of the insertion hole 22 and does not contact an inner peripheral surface of the base end portion 3a. As above, the glass ball 5 is arranged away from the inner peripheral surface of the base end portion 3a by the first spacer 24 and is inserted in the insertion hole 22 so as not to contact the inner peripheral surface of the base end portion 3a. Therefore, at the time of assembling or before the operation, the first longitudinal-direction end portion 5b of the glass ball 5 can be prevented from being damaged by sliding on the valve element 3.

The glass ball 5 projects from the insertion hole 22 to the second side in the axial direction. The second longitudinal-direction end portion 5c reaches the small-diameter portion 17b of the inner hole 17 of the cap 12. A step 17c is formed at an intermediate portion of the small-diameter portion 17b. The small-diameter portion 17b includes a ceiling portion 17d at the second side of the step 17c in the axial direction. A second spacer 25 is fitted in the ceiling portion 17d. The second spacer 25 is a member made of synthetic resin and having a substantially circular plate shape. The second spacer 25 is fitted in the small-diameter portion 17b so as to contact the ceiling portion 17d. A concave portion 25a is formed around a central axis of the second spacer 25. The concave portion 25a is formed in a substantially conical shape. The second longitudinal-direction end portion 5c of the casing 5a contacts the concave portion 25a. With this, the second longitudinal-direction end portion 5c of the casing 5a is arranged away from the ceiling portion 17d and can be prevented from contacting the inner peripheral surface of the cap 12. Therefore, at the time of assembling or before the operation, the second longitudinal-direction end portion 5c of the glass ball 5 can be prevented from being damaged by sliding on the cap 12.

The glass ball 5 arranged as above is supported by the cap 12 through the second spacer 25 and also supported by the valve element 3 through the first spacer 24. With this, the valve element 3 is supported by the glass ball 5 against the biasing force of the biasing spring 4 and is kept at the closed position. In this initial state in which the valve element 3 is held at the closed position, the base end portion 3a of the valve element 3 is located away from a stepped surface 17f of the cap 12, and a space 18 is formed between the base end portion 3a of the valve element 3 and the stepped surface 17f of the cap 12. The stepped surface 17f is a surface having a substantially annular shape and formed around an opening through which the large-diameter portion 17a and the small-diameter portion 17b are connected to each other. Further, the stepped surface 17f is a surface opposed to the base end portion 3a of the valve element 3 at the second side in the axial direction. A communication passage 23 connected to the insertion hole 22 is formed at the intermediate portion 3d of the valve element 3. The space 18 and the valve passage 16 (more specifically, a part of the valve hole 13, i.e., a space around the intermediate portion 3d) are connected to each other through the communication passage 23 and the insertion hole 22.

According to the safety valve 1 configured as above, when the glass ball 5 breaks, the valve element 3 is allowed to move to the second side in the axial direction by the space 18. Further, the fluid in the space 18 can be discharged to the valve passage 16 through the communication passage 23, and therefore, the valve element 3 can be quickly moved to the open position. With this, when the ambient temperature of the safety valve 1 (more specifically, the ambient temperature of the glass ball 5) increases to the predetermined temperature, and the glass ball 5 breaks, the valve element 3 is pushed by the biasing spring 4 and the fluid of the high-pressure passage 14 to quickly move to the open position. Thus, the valve passage 16 can be opened as shown in FIG. 2. With this, the fluid introduced to the high-pressure passage 14 (i.e., the fluid in the high-pressure tank) can be discharged to the atmosphere through the valve hole 13 and the atmosphere open passage 15 (see an arrow in FIG. 2).

According to the safety valve 1 configured as above, as described above, when the glass ball 5 breaks, the intermediate portion 5e of the casing 5a mainly breaks, and the longitudinal-direction end portions 5b and 5c of the casing 5a do not break and are left as large fragments. Since the valve element 3 quickly moves to the open position, these large fragments are basically left in the insertion hole 22 and the small-diameter portion 17b. The possibility that at least one of the fragments of the longitudinal-direction end portions 5b and 5c of the casing 5a gets into the space 18 due to some sort of action is extremely low but is not zero. If the large fragment gets into the space 18, the valve element 3 cannot quickly move to the open position. In this case, the fluid cannot be quickly discharged to the atmosphere. Thus, a desired function cannot be achieved. To avoid this, the safety valve 1 includes the holding body 6.

Holding Body

The holding body 6 is a member which keeps the longitudinal-direction end portions 5b and 5c of the casing 5a in the insertion hole 22 and the small-diameter portion 17b. The holding body 6 includes a first holding ring 31 and a second holding ring 32. The first holding ring 31 is a member made of synthetic resin (for example, silicon rubber) and having a substantially annular shape. The first holding ring 31 has higher elasticity than the first spacer 24. To be specific, the first holding ring 31 deforms more easily than the first spacer 24 and can generate elastic reaction force by the deformation.

The first holding ring 31 is arranged in the insertion hole 22 so as to be located at the base end side of the first spacer 24 and be adjacent to the first spacer 24. A partially spherical part of the first longitudinal-direction end portion 5b of the casing 5a is inserted in an inner hole of the first holding ring 31. More specifically, the partially spherical part of the first longitudinal-direction end portion 5b, i.e., a part that expands the most in the radially outer direction is inserted in the first holding ring 31. The first holding ring 31 is smaller in diameter than the partially spherical part (i.e., a partially spherical part larger in diameter than the intermediate portion 5e) of the first longitudinal-direction end portion 5b, i.e., the part that expands the most in the radially outer direction. Therefore, by inserting the above part of the first longitudinal-direction end portion 5b into the inner hole of the first holding ring 31, the first holding ring 31 elastically deforms. With this, the first holding ring 31 can sandwich the first longitudinal-direction end portion 5b over the entire periphery and tightly hold the first longitudinal-direction end portion 5b. Since the partially spherical part of the first longitudinal-direction end portion 5b, i.e., the part that expands the most in the radially outer direction is held by the first holding ring 31, the amount of elastic deformation of the first holding ring 31 can be made larger than a case where the first holding ring 31 sandwiches a part other than the above part of the first longitudinal-direction end portion 5b. To be specific, holding force of the first holding ring 31 that holds the first longitudinal-direction end portion 5b can be made large. With this, the first longitudinal-direction end portion 5b can be tightly held by the first holding ring 31.

As above, the first longitudinal-direction end portion 5b of the glass ball 5 is held by the first holding ring 31. On the other hand, the second longitudinal-direction end portion 5c of the glass ball 5 is held by the second holding ring 32. The second holding ring 32 is a member made of synthetic resin (for example, silicon rubber) and having a substantially annular shape. The second holding ring 32 has higher elasticity than the second spacer 25. To be specific, the second holding ring 32 deforms more easily than the second spacer 25 and can generate elastic reaction force by the deformation.

The second holding ring 32 is fitted in the small-diameter portion 17b of the cap 12. More specifically, the small-diameter portion 17b includes an insertion hole 17e at the first side of the step 17c in the axial direction, and the insertion hole 17e is larger in diameter than the ceiling portion 17d. The second holding ring 32 is fitted in the insertion hole 17e so as to be adjacent to the second spacer 25 and contact the step 17c. A partially spherical part of the second longitudinal-direction end portion 5c of the casing 5a (i.e., a partially spherical part larger in diameter than the intermediate portion 5e) is inserted in an inner hole of the second holding ring 31. More specifically, the partially spherical part of the second longitudinal-direction end portion 5c, i.e., a part that expands the most in the radially outer direction is inserted in the second holding ring 32. The second holding ring 32 is smaller in diameter than the partially spherical part of the second longitudinal-direction end portion 5c, i.e., the part that expands the most in the radially outer direction. Therefore, by inserting the above part of the second longitudinal-direction end portion 5c into an inner hole of the second holding ring 32, the second holding ring 32 elastically deforms. With this, the second holding ring 32 can sandwich the second longitudinal-direction end portion 5c over the entire periphery and tightly hold the second longitudinal-direction end portion 5c. Since the partially spherical part of the second longitudinal-direction end portion 5c, i.e., the part that expands the most in the radially outer direction is sandwiched by the second holding ring 32, the amount of elastic deformation of the second holding ring 32 can be made larger than a case where the second holding ring 32 sandwiches a part other than the above part of the second longitudinal-direction end portion 5c. To be specific, holding force of the second holding ring 32 that holds the second longitudinal-direction end portion 5c can be made large. With this, the second longitudinal-direction end portion 5c can be tightly held by the second holding ring 32.

In the present invention, first and second longitudinal-direction end-side portions of the glass ball 5 are portions which are located at respective first and second sides of the easy-to-break intermediate portion 5e in a longitudinal direction and do not break by a temperature increase. To be specific, the first longitudinal-direction end portion 5b of the glass ball 5 is a part of the first longitudinal-direction end-side portion of the glass ball 5, and the second longitudinal-direction end portion 5c of the glass ball 5 is a part of the second longitudinal-direction end-side portion of the glass ball 5.

Functions of Safety Valve

In the initial state in which the valve element 3 is held at the closed position in the safety valve 1 configured as above, the valve element 3 is supported by the glass ball 5, and the valve passage 16 is closed. On the other hand, when the ambient temperature of the safety valve 1 increases, and the ambient temperature of the glass ball 5 reaches the predetermined temperature, the glass ball 5 breaks. With this, the movement of the valve element 3 in the open direction is allowed, and the valve element 3 actually moves to the open position by the biasing of the biasing spring 4. At this time, the first longitudinal-direction end portion 5b of the glass ball 5 is held by the first holding ring 31, and the second longitudinal-direction end portion 5c is held by the second holding ring 32. Therefore, after the glass ball 5 breaks, the first longitudinal-direction end portion 5b and second longitudinal-direction end portion 5c of the glass ball 5 as the large fragments can be kept in the insertion hole 22 and the small-diameter portion 17b, respectively, and can be prevented from getting into the space 18. This can prevent a case where at least one of the first longitudinal-direction end portion 5b and second longitudinal-direction end portion 5c of the glass ball 5 is sandwiched between the base end portion 3a of the valve element 3 and the stepped surface 17f of the cap 12 (i.e., sandwiched in the space 18) to hinder the movement of the valve element 3 toward the first side in the axial direction. With this, the possibility that the safety valve 1 does not operate can be reduced.

In the safety valve 1 of the present embodiment, the first longitudinal-direction end portion 5b and second longitudinal-direction end portion 5c of the glass ball 5 are held by the first holding ring 31 and the second holding ring 32, respectively. Therefore, when the glass ball 5 breaks, the longitudinal-direction end portions 5b and 5c can be kept in the insertion hole 22 and the small-diameter portion 17b. With this, the possibility that the movement of the valve element 3 in the open direction is hindered can be further made lower than a case where only one of the longitudinal-direction end portions 5b and 5c is held. Thus, the possibility that the safety valve 1 does not operate can be further reduced. It should be noted that as described above, since the possibility that any of the longitudinal-direction end portions 5b and 5c gets into the space 18 is low, holding both of the longitudinal-direction end portions 5b and 5c is not essential. From the viewpoint that a large fragment is prevented from getting into the space 18, only one of the longitudinal-direction end portions 5b and 5c may be held.

Assembling of Safety Valve

Figure 3A:
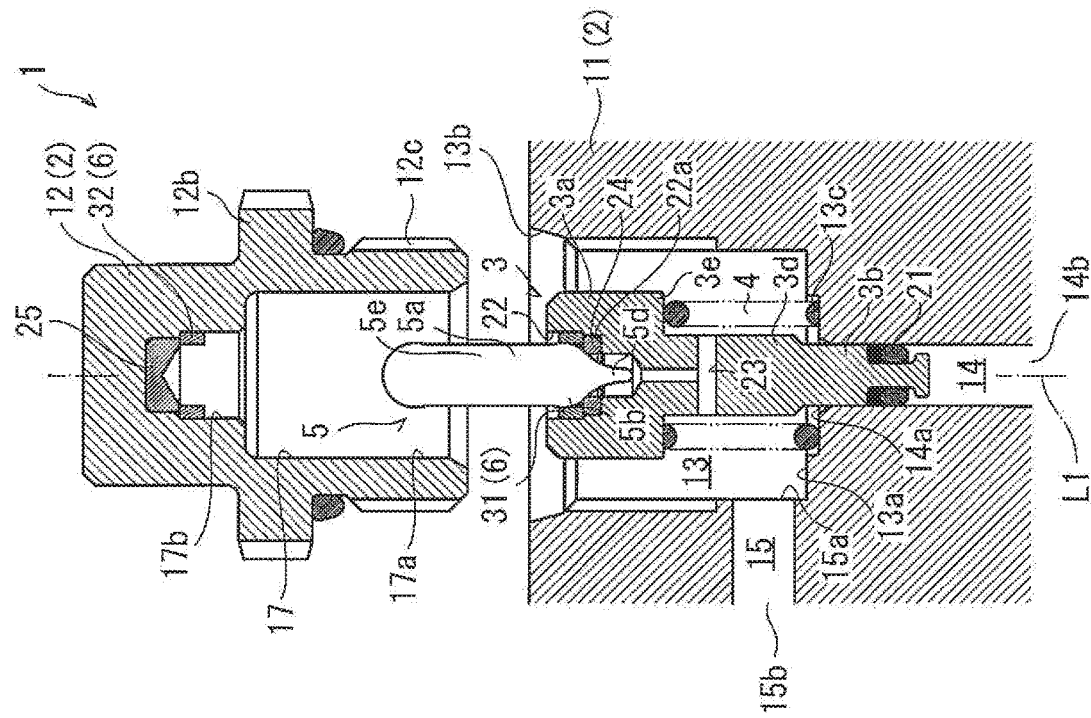
FIGS. 3A and 3B are exploded views each showing the glass ball safety valve of FIG. 1.
Figure 3B:
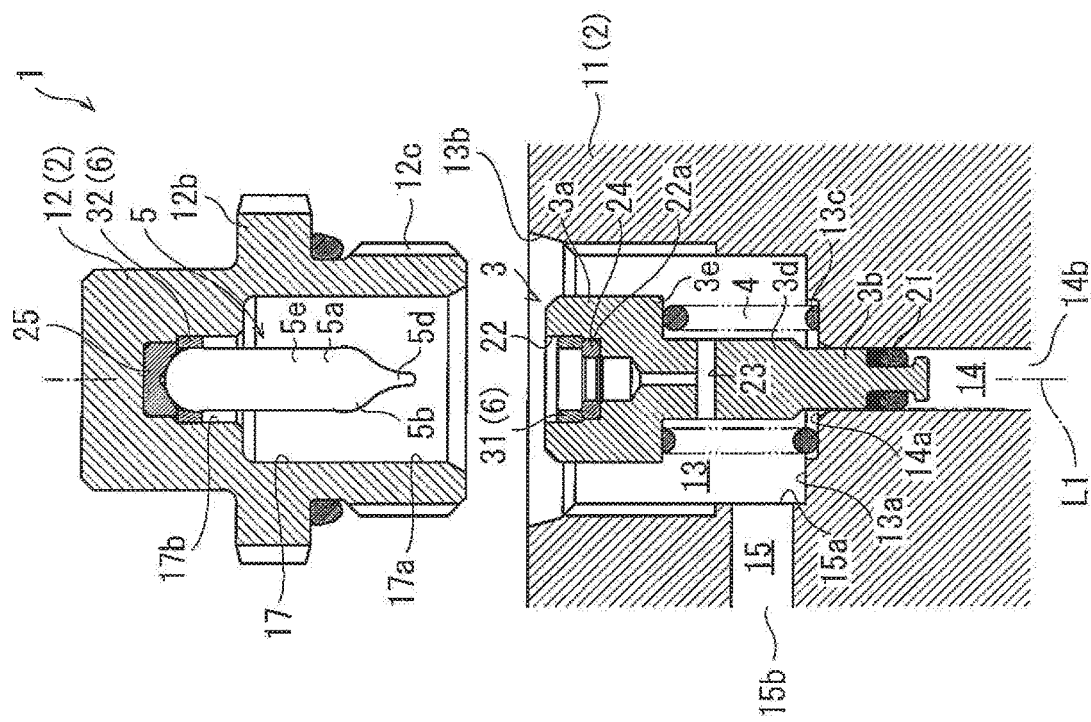

When assembling the safety valve 1, the glass ball 5 can be held by the first holding ring 31 as shown in FIG. 3A, or the glass ball 5 can be held by the second holding ring 32 as shown in FIG. 3B. For example, when assembling the safety valve 1, as shown in FIG. 3A, the glass ball 5 is inserted into the first holding ring 31 attached to the cap 12, and thus, the first holding ring 32 sandwiches the glass ball 5. With this, the inclination, position, and the like of the glass ball 5 with respect to the cap 12 can be adjusted in advance. Therefore, it is unnecessary to attach the valve element 3 to the cap 12 while adjusting the inclination and position of the glass ball 5. Thus, the glass ball 5 is easily assembled. The same is true for a case where as shown in FIG. 3B, the second holding ring 32 attached to the valve element 3 sandwiches the glass ball 5 in advance.

Other Functions, etc.

According to the safety valve 1 of the present embodiment, the spacers 24 and 25 are lower in elastic modulus than the holding rings 31 and 32. With this, the movement of the valve element 3 in the open direction due to the deformation of the spacers 24 and 25 can be suppressed. Thus, the amount of insertion of the valve element 3 in the high-pressure passage 14 can be made small. Therefore, the height of the safety valve 1 can be suppressed as compared to a case where the spacers 24 and 25 easily deform.

Embodiment 2

Figure 4:
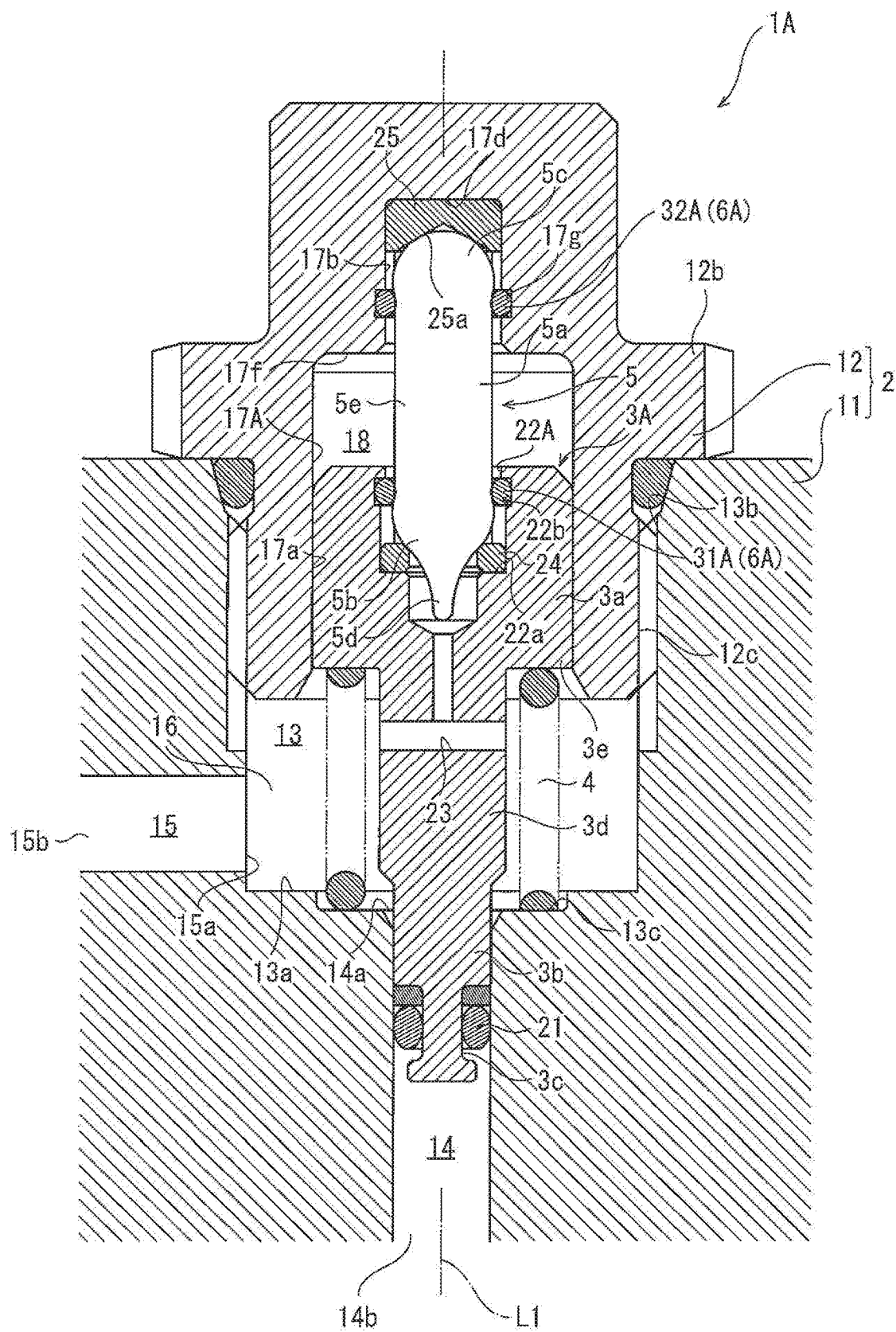
FIG. 4 is a sectional view showing the glass ball safety valve according to Embodiment 2 of the present invention.

As shown in FIG. 4, the safety valve 1A of Embodiment 2 is similar in configuration to the safety valve 1 of Embodiment 1. Therefore, components of the safety valve 1A of Embodiment 2 which are different from the components of the safety valve 1 of Embodiment 1 will be mainly explained. The same reference signs are used for the same components, and a repetition of the same explanation is avoided. The same is true for the safety valves 1B and 1C of Embodiments 3 and 4 described below.

A first seal groove 22b is formed on an inner peripheral surface of an insertion hole 22A of a valve element 3A of the safety valve 1A of Embodiment 2. The first seal groove 22b is located at the base end side of the first spacer 24 and is located in the vicinity of an opening end of the insertion hole 22A. The first seal groove 22b is a groove that is concave in the radially outer direction. The first seal groove 22b is formed over the entire periphery in the circumferential direction. Further, a second seal groove 17g is formed on an inner peripheral surface of the small-diameter portion 17b of an inner hole 17A of a cap 12A. The second seal groove 17g is located at the tip end side of the second spacer 24. The second seal groove 17g is a groove that is concave in the radially outer direction. The second seal groove 17g is formed over the entire periphery in the circumferential direction. O rings 31A and 32A constituting a holding body 6A are fitted in the respective seal grooves 22b and 17g formed as above.

The first O ring 31A that is one example of a first holding member is made of synthetic rubber and formed in an annular shape. As with the first holding ring 31, the first O ring 31A is smaller in diameter than the partially spherical part of the first longitudinal-direction end portion 5b, i.e., the part that expands the most in the radially outer direction. Further, the first O ring 31A sandwiches a part of the first longitudinal-direction end portion 5b which part is located at the base end side of the partially spherical part (i.e., a base end-side part of the first longitudinal-direction end-side portion).

The second O ring 32A is formed in an annular shape. As with the second holding ring 32, the second O ring 32A is smaller in diameter than the partially spherical part of the second longitudinal-direction end portion 5c, i.e., the part that expands the most in the radially outer direction. The second O ring 32A sandwiches a part of the second longitudinal-direction end portion 5c which part is located at the base end side of the partially spherical part (i.e., a tip end-side part of the second longitudinal-direction end-side portion).

As above, each of the two O rings 31A and 32A sandwiches an axially inner part of the part that expands the most in the radially outer direction in the glass ball 5. With this, when the glass ball 5 breaks, the O rings 31A and 32A hold the large fragments to restrict the movements of the large fragments toward the space 18. Thus, the first longitudinal-direction end portion 5b and second longitudinal-direction end portion 5c of the glass ball 5 as the large fragments can be kept in the insertion hole 22 and the small-diameter portion 17b, respectively, and can be prevented from getting into the space 18.

Other than the above, the safety valve 1A of Embodiment 2 has the same operational advantages as the safety valve 1 of Embodiment 1.

Embodiment 3

Figure 5:
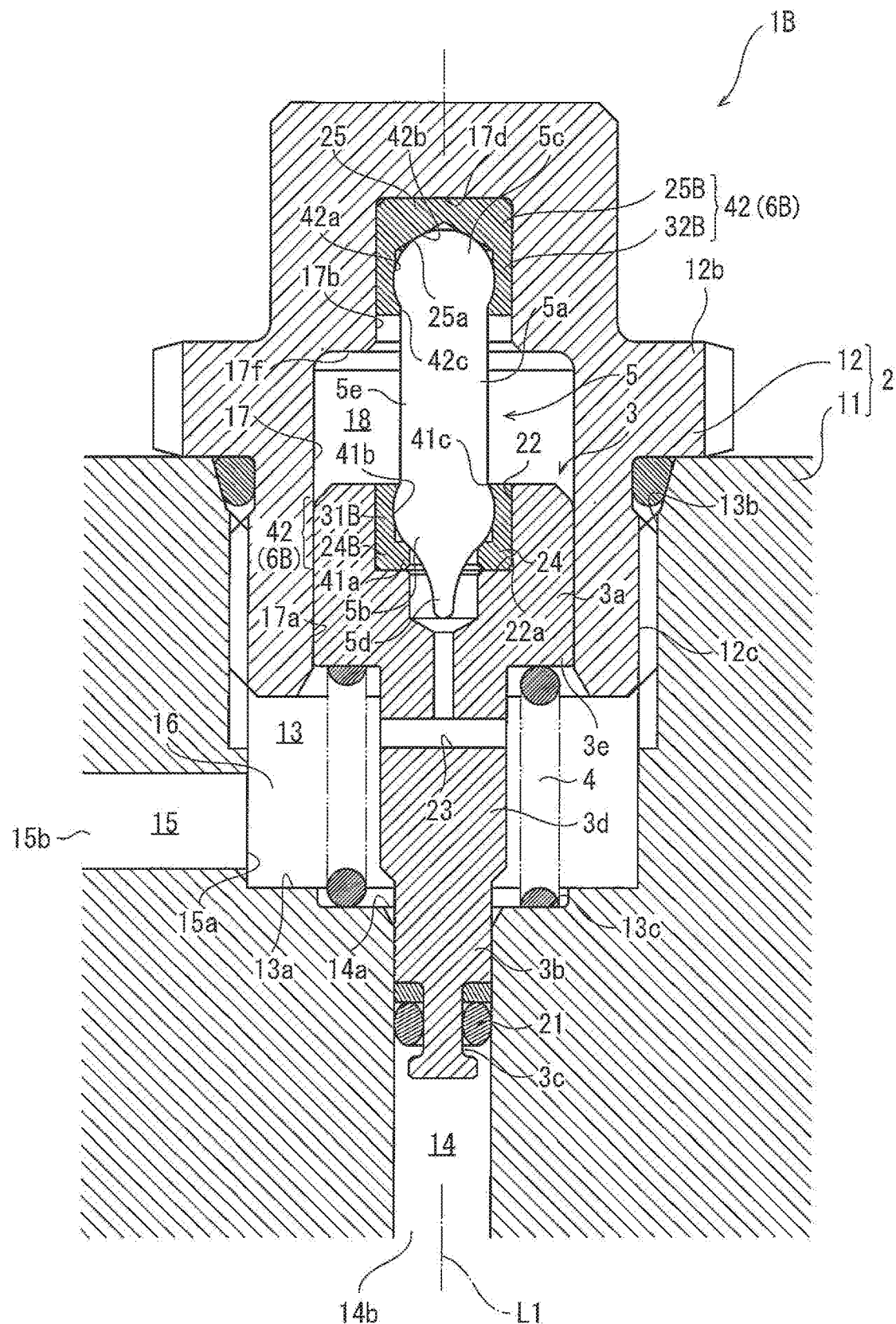
FIG. 5 is a sectional view showing the glass ball safety valve according to Embodiment 3 of the present invention.
Figure 6:
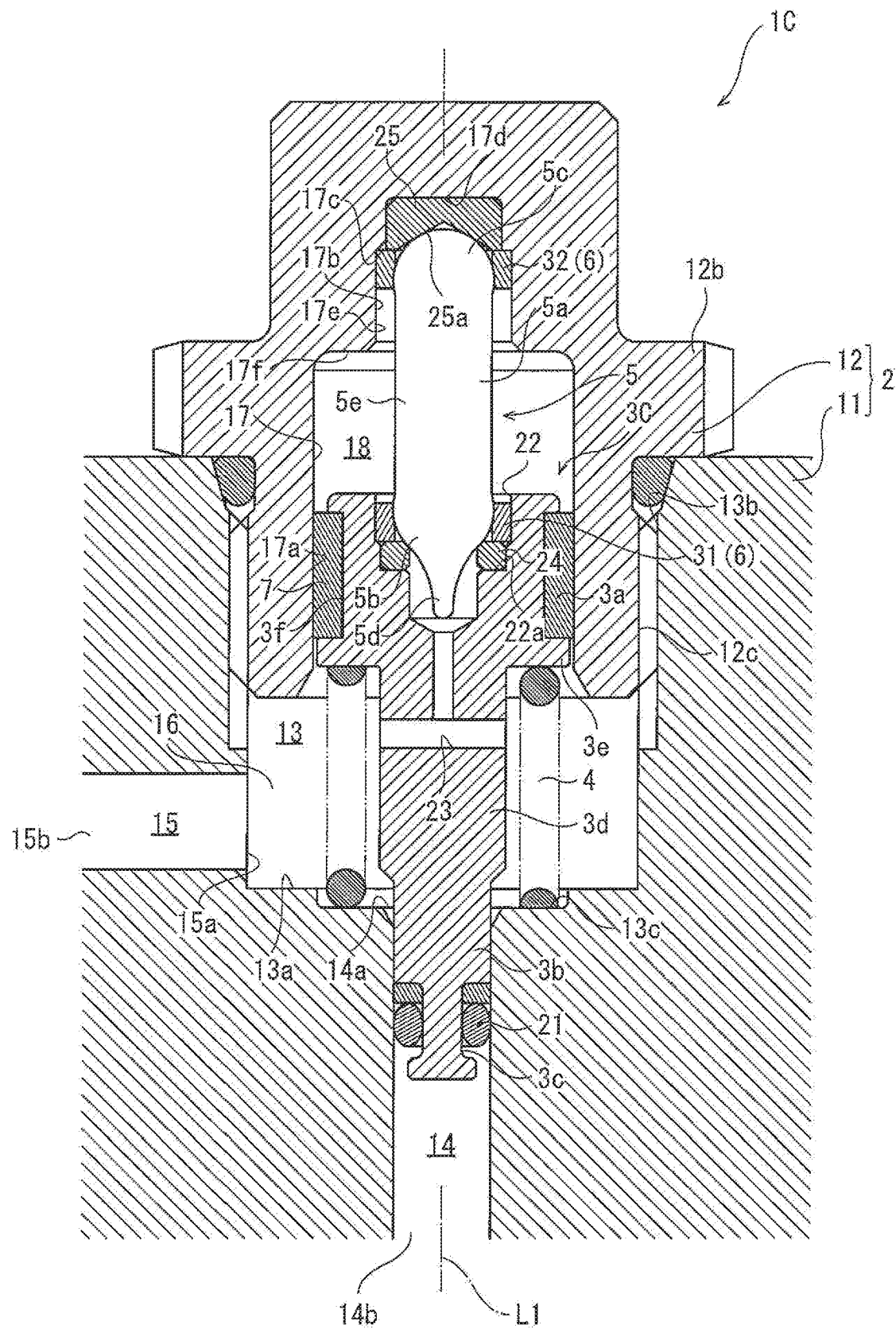
FIG. 6 is a sectional view showing the glass ball safety valve according to Embodiment 4 of the present invention.

As shown in FIG. 5, a holding body 6B of the safety valve 1B of Embodiment 3 includes a first holding spacer 41 and a second holding spacer 42. The first holding spacer 41 includes a first spacer 24B and a first holding ring 31B, and the first spacer 24B and the first holding ring 31B are integrally configured. To be specific, the first holding spacer 41 is formed in a substantially cylindrical shape and includes an inward flange 41a at an opening end portion located at the first side in the axial direction. The inward flange 41a projects in the radially inner direction and is formed at the opening end portion over the entire periphery in the circumferential direction.

The first holding spacer 41 having such shape is press-fitted in a portion of the insertion hole 22 which portion is located at the base end side of the step 22a. The first longitudinal-direction end portion 5b of the glass ball 5 is inserted in an inner hole 41b of the first holding spacer 41, and the partially spherical part of the first longitudinal-direction end portion 5b is placed on and supported by the inward flange 41a. Further, the first holding spacer 41 is made of synthetic resin and can elastically deform. An elastic coefficient of the first holding spacer 41 is smaller than that of synthetic rubber. The inner hole 41b of the first holding spacer 41 is substantially the same in diameter as the partially spherical part of the first longitudinal-direction end portion 5b of the glass ball 5, i.e., the part that expands the most in the radially outer direction, and the first longitudinal-direction end portion 5b of the glass ball 5 is fitted in the inner hole 41b.

Further, the first holding spacer 41 includes a claw portion 41c at an opening end portion located at the second side in the axial direction. The claw portion 41c projects in the radially inner direction and is formed at the opening end portion at the second side in the axial direction over the entire periphery in the circumferential direction. It should be noted that the claw portion 41c does not necessarily have to be formed over the entire periphery in the circumferential direction, and a plurality of claw portions 41c may be formed at intervals. The claw portion 41c formed as above catches the partially spherical part of the first longitudinal-direction end portion 5b of the glass ball 5, and therefore, the partially spherical part of the first longitudinal-direction end portion 5b does not come out from the first holding spacer 41.

The second holding spacer 42 includes a second spacer 25B and a second holding ring 32B, and the second spacer 25B and the second holding ring 32B are integrally configured. To be specific, the second holding spacer 42 is formed in a substantially bottomed cylindrical shape. The second holding spacer 42 is press-fitted in the small-diameter portion 17b such that an upper surface thereof contacts the ceiling portion 17d of the cap 12. The second longitudinal-direction end portion 5c of the glass ball 5 is inserted in an inner hole 42a of the second holding spacer 42. The second longitudinal-direction end portion 5c of the glass ball 5 contacts and is supported by a ceiling surface 42b of the second holding spacer 42. Further, the second holding spacer 42 is made of synthetic resin and can elastically deform. An elastic coefficient of the second holding spacer 42 is smaller than that of synthetic rubber. The inner hole 42a of the second holding spacer 42 is substantially the same in diameter as the partially spherical part of the second longitudinal-direction end portion 5c of the glass ball 5, i.e., the part that expands the most in the radially outer direction, and the second longitudinal-direction end portion 5c of the glass ball 5 is fitted in the inner hole 42a.

Further, the second holding spacer 42 includes a claw portion 42c at an opening end portion located at the first side in the axial direction. The claw portion 42c projects in the radially inner direction and is formed at the opening end portion at the first side in the axial direction over the entire periphery in the circumferential direction. It should be noted that the claw portion 42c does not necessarily have to be formed over the entire periphery in the circumferential direction, and a plurality of claw portions 42c may be formed at intervals. The claw portion 42c formed as above catches the partially spherical part of the second longitudinal-direction end portion 5c of the glass ball 5, and therefore, the partially spherical part of the second longitudinal-direction end portion 5c does not come out from the second holding spacer 42.

According to the safety valve 1B configured as above, the first spacer 24B and the first holding ring 31B are configured integrally, and the second spacer 25B and the second holding ring 32B are configured integrally. Therefore, the number of parts can be reduced.

Other than the above, the safety valve 1B of Embodiment 3 has the same operational advantages as the safety valve 1 of Embodiment 1.

Embodiment 4

An attaching groove 3f is formed on an outer peripheral surface of the base end portion 3a of a valve element 3C of the safety valve 1C of Embodiment 4. The attaching groove 3f is concave in the radially inner direction and is formed on the outer peripheral surface of the base end portion 3a over the entire periphery in the circumferential direction. A sliding ring 7 is fitted in the attaching groove 3f. The sliding ring 7 that is one example of a sliding body is formed in a substantially cylindrical shape and is made of a material, such as Teflon (trademark), polyacetal, or polyamide, having lower sliding resistance than the valve element 3C. An outer diameter of the sliding ring 7 is substantially equal to the diameter of the large-diameter portion 17a of the cap 12, and the sliding ring 7 tightly contacts the inner peripheral surface of the cap 12. To be specific, the sliding ring 7 and the cap 12 contact each other without a gap therebetween, and thus, a gap between the valve element 3 and the inner peripheral surface of the cap 12 is sealed. With this, when the glass ball 5 breaks, fine fragments of the glass ball 5 can be prevented from getting into the gap between the sliding ring 7 and the cap 12. This can prevent, for example, an increase in sliding resistance generated when the fine fragments get into the gap between the sliding ring 7 and the cap 12. Further, the sliding ring 7 tightly contacts the inner peripheral surface of the cap 12, so that when the valve element 3 move in the open direction, the sliding ring 7 moves to the second side in the axial direction while sweeping the fine fragments adhering to the inner peripheral surface of the cap 12. Therefore, the fine fragments can be prevented from getting into the gap between the sliding ring 7 and the cap 12 even during the movement.

Other than the above, the safety valve 1C of Embodiment 4 has the same operational advantages as the safety valve 1 of Embodiment 1.

Other Embodiments

According to the safety valves 1 and 1A to 1C of Embodiments 1 to 4, the glass ball 5 is formed in such a shape that the first longitudinal-direction end portion 5b includes the tip end portion 5d. However, the glass ball 5 does not necessarily have to be formed in such shape. For example, as described above, each of both of the first longitudinal-direction end portion 5b and second longitudinal-direction end portion 5c of the glass ball 5 may be formed in a partially spherical shape. The glass ball 5 is only required to have such a shape that when the glass ball 5 breaks, the first longitudinal-direction end portion 5b and second longitudinal-direction end portion 5c of the glass ball 5 are left as large fragments.

According to the safety valves 1 and 1A to 1C of Embodiments 1 to 4, the first longitudinal-direction end portion 5b and second longitudinal-direction end portion 5c of the glass ball 5 are held by the holding rings 31 and 32, respectively. However, holding both of the first longitudinal-direction end portion 5b and second longitudinal-direction end portion 5c of the glass ball 5 is not essential. As described above, the first longitudinal-direction end portion 5b and second longitudinal-direction end portion 5c of the glass ball 5 hardly get into the space 18, and the possibility that any of the longitudinal-direction end portions 5b and 5c gets into the space 18 is brought close to zero. Therefore, only one of the first longitudinal-direction end portion 5b and second longitudinal-direction end portion 5c of the glass ball 5 may be held by the holding body 6 due to any design reason.

According to the safety valves 1 and 1A to 1C of Embodiments 1 to 4, the valve passage 16 is closed by inserting the valve element (3 and 3A to 3C) into the high-pressure passage 14. However, the valve passage 16 does not necessarily have to be closed as such. For example, the valve passage 16 may be closed by: providing a seat member in the high-pressure passage 14 or around an opening of the high-pressure passage 14; and making the valve element (3 and 3A to 3C) be seated on the seat member. Further, according to the safety valves 1 and 1A to 1C of Embodiments 1 to 4, the gas in the space 18 is introduced to the valve passage 16 through between the valve element 3 and the cap 12. Therefore, the communication passage 23 does not necessarily have to be formed at the valve element 3.

Further, in the safety valves 1 and 1A to 1C of Embodiments 1 to 4, a concave portion may be formed on the inner peripheral surface of the large-diameter portion of the cap 12 and in the vicinity of the stepped surface 17f. The concave portion is formed so as to be concave in the radially outer direction from the inner peripheral surface and extends over the entire periphery of the inner peripheral surface in the circumferential direction. The concave portion is connected to the space 18. When the glass ball 5 breaks, scattering fragments get into the concave portion. To be specific, the volume of the space that accommodates the fragments generated when the glass ball 5 breaks can be increased. Further, adhesive sheets may be attached to surfaces of the concave portion (for example, a peripheral surface extending in the circumferential direction, a surface at the first side in the axial direction, etc.). With this, the fragments having gotten into the concave portion can be captured by the adhesive sheets to be prevented from returning to the space 18, and this can prevent a case where the fragments having gotten into the concave portion fall to get into the gap between the valve element 3 and the cap 12.

Further, in the safety valves 1 and 1A to 1C of Embodiments 1 to 4, a concave groove may be formed on an end surface, located at the second side in the axial direction, of the base end portion 3a of the valve element 3. The concave groove is formed on the above end surface as, for example, a groove having an annular shape about the axis L1. It should be noted that the diameter and shape of the concave groove are not limited. By forming the concave groove, the fragments generated wen the glass ball 5 breaks can be accommodated in the concave groove. Therefore, as with the above-described concave portion, the volume of the space accommodating the fragments can be increased.

According to the safety valve 1C of Embodiment 4, the glass ball 5 is held by the first holding ring 31 and the second holding ring 32. However, in order to achieve only the function of the sliding ring 7, the glass ball 5 does not necessarily have to be held by the first holding ring 31 and the second holding ring 32.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the scope of the present invention.

REFERENCE SIGNS LIST 1, 1A to 1C safety valve
2, 2A housing
3, 3A valve element
4 biasing spring
5 glass ball
5b first longitudinal-direction end portion
5c second longitudinal-direction end portion
5e intermediate portion
6, 6A, 6B holding body
7 sliding ring (sliding body)
11 block
12 cap
13 valve hole
14b first port
15b second port
16 valve passage
18 space
24 first spacer
25 second spacer
31 first holding ring (first holding member)
31A first O ring (first holding member)
32 second holding ring (second holding member)
32A second O ring (second holding member)

The invention claimed is:

1. A glass ball safety valve comprising:
a housing including a valve passage connecting a first port and a second port;
a valve element in the housing so as to close the valve passage, the valve element being movable in an open direction so as to open the valve passage;
a biasing spring configured to bias the valve element in the open direction;
a glass ball extending in the open direction from the valve element and in the housing so as to support the valve element against biasing force of the biasing spring with a space between the valve element and the housing, the glass ball including a longitudinal-direction intermediate portion that breaks at a predetermined temperature, the glass ball in a broken state allowing a movement of the valve element in the open direction; and
a holding body in the housing and holding at least one of a first longitudinal-direction end-side portion and second longitudinal-direction end-side portion of the glass ball, wherein
the holding body is formed in an annular shape and elastically deformable.

2. The glass ball safety valve according to claim 1, wherein the holding body includes:
a first holding member at the valve element and holding the first longitudinal-direction end-side portion of the glass ball; and
a second holding member at the housing and holding the second longitudinal-direction end-side portion of the glass ball.

3. The glass ball safety valve according to claim 2, wherein each of the first holding member and the second holding member is formed in an annular shape and elastically deformable.

4. The glass ball safety valve according to claim 3, wherein:
the first longitudinal-direction end-side portion and second longitudinal-direction end-side portion of the glass ball include respective partially spherical parts each of which is larger in diameter than the intermediate portion of the glass ball; and
the first holding member and the second holding member hold the respective partially spherical parts.

5. The glass ball safety valve according to claim 2, wherein:
the housing includes a block and a cap, the block including a valve hole at which the valve element is arranged, the cap being configured to close the valve hole; and
the second holding member is at the cap.

6. A glass ball safety valve comprising:
a housing including a valve passage connecting a first port and a second port;
a valve element in the housing so as to close the valve passage, the valve element being movable in an open direction so as to open the valve passage;
a biasing spring configured to bias the valve element in the open direction;
a glass ball extending in the open direction from the valve element and in the housing so as to support the valve element against biasing force of the biasing spring with a space between the valve element and the housing, the glass ball including a longitudinal-direction intermediate portion that breaks at a predetermined temperature, the glass ball in a broken state allowing a movement of the valve element in the open direction; and
a holding body in the housing and holding at least one of a first longitudinal-direction end-side portion and second longitudinal-direction end-side portion of the glass ball, wherein:
the holding body includes:
a first holding member at the valve element and holding the first longitudinal-direction end-side portion of the glass ball, and
a second holding member at the housing and holding the second longitudinal-direction end-side portion of the glass ball;
the first longitudinal-direction end-side portion of the glass ball supports the valve element through a first spacer made of synthetic resin;
the housing supports the second longitudinal-direction end-side portion of the glass ball through a second spacer made of synthetic resin; and
elastic moduli of the first spacer and the second spacer are lower than elastic moduli of the first holding member and the second holding member.

7. A glass ball safety valve comprising:
a housing including a valve passage connecting a first port and a second port;
a valve element in the housing so as to close the valve passage, the valve element being movable in an open direction so as to open the valve passage;
a biasing spring configured to bias the valve element in the open direction;
a glass ball extending in the open direction from the valve element and in the housing so as to support the valve element against biasing force of the biasing spring with a space between the valve element and the housing, the glass ball including a longitudinal-direction intermediate portion that breaks at a predetermined temperature, the glass ball in a broken state allowing a movement of the valve element in the open direction; and a holding body in the housing and holding at least one of a first longitudinal-direction end-side portion and second longitudinal-direction end-side portion of the glass ball, wherein:

the holding body includes:
  a first holding member at the valve element and holding the first longitudinal-direction end-side portion of the glass ball, and
  a second holding member at the housing and holding the second longitudinal-direction end-side portion of the glass ball;

the first longitudinal-direction end-side portion of the glass ball supports the valve element through a first spacer made of synthetic resin;

the housing supports the second longitudinal-direction end-side portion of the glass ball through a second spacer made of synthetic resin;

the first holding member is configured integrally with the first spacer; and the second holding member is configured integrally with the second spacer.

8. A glass ball safety valve comprising:

a housing including a valve passage connecting a first port and a second port;

a valve element in the housing so as to close the valve passage, the valve element being movable in an open direction so as to open the valve passage;

a biasing spring configured to bias the valve element in the open direction;

a glass ball extending in the open direction from the valve element and in the housing so as to support the valve element against biasing force of the biasing spring with a space between the valve element and the housing, the glass ball including a longitudinal-direction intermediate portion that breaks at a predetermined temperature, the glass ball in a broken state allowing a movement of the valve element in the open direction;

a holding body in the housing and holding at least one of a first longitudinal-direction end-side portion and second longitudinal-direction end-side portion of the glass ball, wherein the housing includes a block and a cap, the block including a valve hole at which the valve element is arranged, the cap being configured to close the valve hole; and further comprising a sliding body that seals a gap between the valve element and the inner peripheral surface of the cap.

\* \* \* \* \*